United States Patent
Hicks

(10) Patent No.: US 10,491,885 B1
(45) Date of Patent: Nov. 26, 2019

(54) POST-PROCESSING BY LIDAR SYSTEM GUIDED BY CAMERA INFORMATION

(71) Applicant: Luminar Technologies, Inc., Orlando, FL (US)

(72) Inventor: Richmond Hicks, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/007,382

(22) Filed: Jun. 13, 2018

(51) Int. Cl.
| | | |
|---|---|---|
| *H04N 13/275* | (2018.01) | |
| *G01S 17/02* | (2006.01) | |
| *G06K 9/00* | (2006.01) | |
| *G06T 17/05* | (2011.01) | |
| *H04N 13/271* | (2018.01) | |
| *H04N 13/254* | (2018.01) | |
| *G01S 7/484* | (2006.01) | |
| *G01S 7/48* | (2006.01) | |
| *G01S 17/10* | (2006.01) | |
| *G01S 17/42* | (2006.01) | |
| *G01S 17/93* | (2006.01) | |

(52) U.S. Cl.
CPC ......... *H04N 13/275* (2018.05); *G01S 7/4802* (2013.01); *G01S 7/484* (2013.01); *G01S 17/023* (2013.01); *G01S 17/107* (2013.01); *G01S 17/42* (2013.01); *G06K 9/00791* (2013.01); *G06T 17/05* (2013.01); *H04N 13/254* (2018.05); *H04N 13/271* (2018.05); *G01S 17/936* (2013.01)

(58) Field of Classification Search
None
See application file for complete search history.

(56) References Cited

U.S. PATENT DOCUMENTS

| | | | |
|---|---|---|---|
| 8,488,877 B1* | 7/2013 | Owechko | G06K 9/00704 382/103 |
| 2007/0070069 A1* | 3/2007 | Samarasekera | G06F 3/011 345/427 |
| 2010/0103196 A1* | 4/2010 | Kumar | G06F 3/012 345/633 |
| 2010/0157280 A1* | 6/2010 | Kusevic | G01S 7/4972 356/4.01 |
| 2012/0099340 A1* | 4/2012 | Buchter | G02F 1/365 362/583 |
| 2015/0350378 A1* | 12/2015 | Hertel | H04L 67/42 709/203 |
| 2016/0221503 A1* | 8/2016 | Krokel | G06T 5/006 |
| 2017/0242442 A1* | 8/2017 | Minster | G05D 1/0248 |

(Continued)

OTHER PUBLICATIONS

Balch, Tucker, "Grid-based Navigation for Mobile Robots," Research Gate, Jan. 2000, pp. 1-10.

(Continued)

*Primary Examiner* — Mohammed Jebari

(57) ABSTRACT

Post-processing in a lidar system may be guided by camera information as described herein. In one embodiment, a camera system has a camera to capture images of the scene. An image processor is configured to classify an object in the images from the camera. A lidar system generates a point cloud of the scene and a modeling processor is configured to correlate the classified object to a plurality of points of the point cloud and to model the plurality of points as the classified object over time in a 3D model of the scene.

19 Claims, 10 Drawing Sheets

(56) References Cited

U.S. PATENT DOCUMENTS

| | | | |
|---|---|---|---|
| 2017/0345311 A1* | 11/2017 | Sugiura | G08G 1/167 |
| 2017/0371348 A1* | 12/2017 | Mou | G01S 17/42 |
| 2018/0136332 A1* | 5/2018 | Barfield, Jr. | G01S 17/42 |
| 2018/0203113 A1* | 7/2018 | Taylor | G01S 17/023 |
| 2018/0203124 A1* | 7/2018 | Izzat | G01S 17/936 |

OTHER PUBLICATIONS

Havoutis et al., "Lidar-Based Navigation-Level Path Planning for Field-Capable Legged Robots," WSPC—Proceedings, Apr. 24, 2015, pp. 1-8.

* cited by examiner

POST-PROCESSING BY LIDAR SYSTEM GUIDED BY CAMERA INFORMATION

TECHNICAL FIELD

The present description relates generally to lidar and in particular to lidar return data post processing using camera data.

BACKGROUND

Autonomous vehicle (AV) navigation in some cases uses a high resolution three-dimensional (3D) model of the surroundings of the vehicle. The 3D model is formed by defining a 3D grid of spaces and tracking points entering and exiting the spaces to understand what space is free, filled, or unknown due to sensor occlusion. In some cases, the system identifies groups of points belonging to an object without regard to the identity of the object. The grouping can be used to simplify the tracking of points as well as to infer the state of unknown spaces in the grid that are occluded by other objects in the surroundings.

For example, when a group of points moves behind an object the system may reasonably conclude that the space behind the occlusion is occupied by that object and not free space. As the group of points exits the occluded area, the system may reasonably conclude that the occluded space is now free or at least that it is vacated by the object.

Lidar, for example, can be used to generate a 3D point cloud and to track the movement of points in that cloud. The movement can be tracked in all three dimensions so that lidar data is particularly well suited to generating a high resolution 3D model of the surroundings.

In some cases, the points in the point cloud are grouped together on the basis of comparing motion vectors of all of the points over time. A set of points with common, or consistent motion vectors, i.e. a clump of points traveling with the same velocity and acceleration are identified as belonging to a common object and are then grouped together and treated as a single object. Grouping the points reduces the compute load by modeling a group of multiple points in the surroundings as a single object instead of as multiple independent points.

BRIEF DESCRIPTION OF THE DRAWINGS

The appended claims set forth the features of the invention with particularity. The present invention is illustrated by way of example, and not by way of limitation, in the figures of the accompanying drawings in which like reference numerals refer to similar elements.

DESCRIPTION OF EXAMPLE EMBODIMENTS

Figure 1:
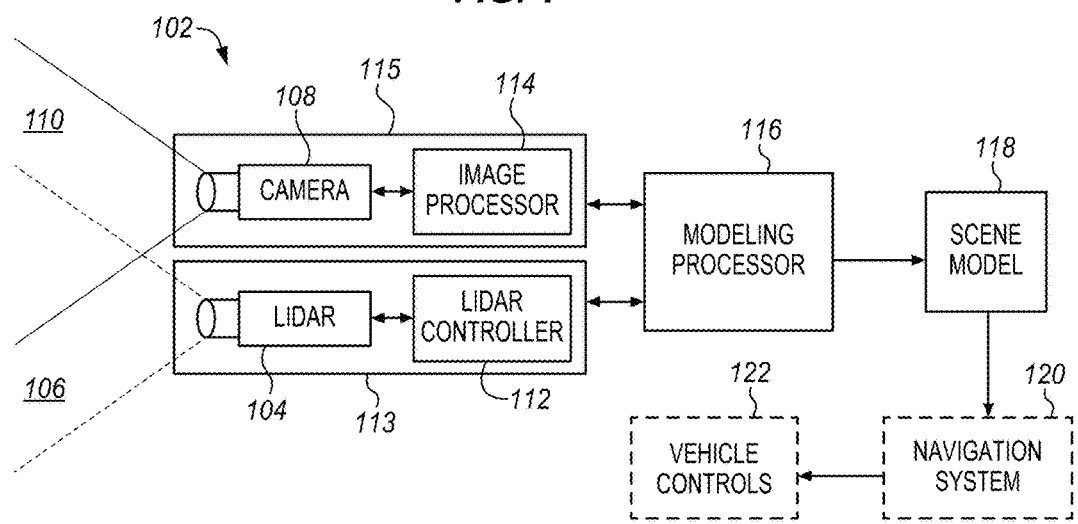
FIG. 1 is a block diagram of a scene modeling system.

As described herein, a visible light camera may be used for object detection and classification. In the vehicle navigation context, objects may be classified, for example, as a tree, a car, a truck, a pedestrian, a wall, etc. The visible light camera can be used for a fast, high quality object classification using, for example, color and intensity differences in a two-dimensional image. A navigation system can then determine which lidar returns can be attributed to an object that has already been classified by the camera system and then form a grouping of points on this basis.

A visible light camera classification is faster and requires less computation than inferring a grouping based on common motion vectors in the point cloud. The speed of the visible light camera comes in part because many objects can be detected and classified from a single camera image without the need to track object motion over time in the point cloud. Note that while a visible camera is referred to, a near infra-red, short wave infrared, thermal or any other camera suitable for fast, high quality object classification may be used. The type of camera referred to herein is also faster in part because it senses light generated by the scene and reflected from the scene by other external light sources, such as the sun, vehicle headlights, or other artificial light. The camera can capture a frame as quickly as sufficient light is incident on the sensor. It does not wait for an emitted beam to be reflected but captures all light incident on the photodetectors of the camera.

A navigation system, such as an autonomous vehicle (AV) navigation system may include a visible light camera for many purposes including to recognize traffic signs and signals that are not visible in the NIR (Near Infrared) or SWIR (Short Wavelength Infrared) spectrum that would typically be detected by the lidar. The visible light camera will have color information to distinguish, for example, symbols and numbers on a sign from the background of the sign. A typical lidar lacks color information, particularly in the visible light spectrum of the sign. It may also not have resolution high enough to read or distinguish signs. As a result, the visible light camera is very well suited to object detection and classification and there has been significant work on detection and classification methods for color images. The lidar has difficulty identifying objects based only on the lidar data, but is very well-suited to determining distance, size, and tracking movement.

Objects detected and classified in the camera system can be used to guide the post processing of lidar data and especially to guide the maintenance of a 3D (Three-Dimensional) model of the surroundings. Once an object has been classified by the camera system, that classification can be refined by the lidar system to establish the precise size of the object and then this can be modeled frame to frame in the 3D model as a single object rather than attempting to classify the objects using lidar data alone.

FIG. 1 is a block diagram of a scene modeling system with a lidar system augmented with a visible light camera. The scene modeling system 102 has a lidar system 113 with a lidar field of regard 106 and a visible light camera system 115 with a camera field of regard 110. The two fields of view overlap so that objects imaged by the camera are within the point cloud generated by the lidar. The scene within the fields of view may be of a portion of the road in front of the vehicle and along which the vehicle is traveling. Other scenes may be views to the side and to the rear.

The lidar system 113 has a lidar 104 coupled to a lidar controller 112 that drives and controls the lidar and receives return data generated by the lidar. There may be an optical system within the lidar system 113 for directing laser pulses, modulated waves or any other format of light to the scene and for directing the resulting laser reflections into a detector of the lidar 104. The lidar controller may be integrated into the lidar or implemented as multiple components. The lidar controller generates a point cloud in which each point represents a three-dimensional position in the scene in the field of regard. The particular configuration, resolution, and other information generated by the lidar processor and the manner of operation of the lidar processor may be modified to suit different implementations. The point cloud is sent to a 3D modeling processor 116 to be used in generating a 3D model 118 of the scene. The controller may alternatively be a part of the modeling processor or independent as shown.

The lidar controller 112 sends a sequence of point clouds or point cloud changes over time so that a motion vector can be associated with each point in the point cloud. In embodiments, the lidar has a frame rate and completes a full scan of its field of regard after each frame. Each complete frame provides an update to the point cloud. Motion vectors are determined by comparing point positions in the cloud for each frame. The motion vector for each frame indicates how that point has moved from the previous frame. In embodiments, the motion vectors are compensated for movement of the vehicle and the lidar through the scene.

The motion vectors may be used to group points together as relating to the same object. As an example, a vehicle moving down the road in front of the lidar will be represented by many points. These points will all move toward and away from the lidar together as the corresponding vehicle will move toward and away from the lidar.

The visible light camera system 115 has a camera 108 generates digital images of the scene within its field of regard 110 as determined by an optical system that focuses light generated by or reflected from the scene onto the sensor 108. The images are sent to an image processor 114. In embodiments, the camera operates at a frame rate and generates a new image or frame at a rate determined by the frame rate. The frame rate may be determined by the image processor or other upstream component. Alternatively, the camera may capture an image in response to a command from an external controller such as the modeling processor. The images may be 2D color representations of the scene. In some implementations, multiple cameras are used to determine depth or range from the cameras to the scene. Multiple cameras may also be used to provide information at different wavelengths or different fields of view.

The image processor 114 receives the images from the camera and then uses image understanding techniques to detect image objects and then to classify or recognize the detected objects. As a part of these tasks or as an additional task, each detected object is localized. A variety of different techniques can be used for object classification some of which are designated as artificial intelligence. As a result, a particular part of the image may be identified as corresponding to a physical object such as a vehicle, a wall, a curb, a street sign, etc. The object classifications are then sent to the modeling processor 116. The images may also be sent to the 3D model processor. The image processor may be discrete as shown or it may be incorporated into the modeling processor or the camera.

In embodiments, a logic circuit controls the operation of the camera and a separate dedicated logic block performs artificial intelligence detection, classification, and localization functions. Dedicated artificial intelligence or deep neural network logic is available with memory to allow the logic to be trained to perform different artificial intelligence tasks. The classification takes an apparent image object and relates that image object to an actual physical object. The image processor provides localization of the object with within the 2D pixel array of the camera by determining which pixels correspond to the classified object. The image processor may also provide a distance or range of the object for a 3D localization. For a 2D camera, after the object is classified, its approximate size will be known. This can be compared to the size of the object on the 2D pixel array. If the object is large in terms of pixels then it is close, while if it is small in terms of pixels, then it is farther away. Alternatively, a 3D camera system may be used to estimate range or distance.

A variety of different visible light cameras may be used, such as CMOS (Complementary Metal Oxide Semiconductor) or CCD (Charge Coupled Device) cameras, with different color and sensitivity characteristics. Visible light is suggested because objects designed for human perception are best perceived using visible light. In addition, visible light cameras and image processors are commonly available. The camera may have a different or extended spectrum so that only some colors are perceived or so that infrared or ultraviolet are also perceived by the camera. While 2D images are discussed herein, the camera may be replaced with a multiple sensor or 3D camera so that 3D images are provided and analyzed for object classification. For some object classification techniques a 3D image provides more accurate results. However, the distance data absent from a 2D image is also generated by the lidar so that the benefits of a 3D camera are reduced in some respects.

Object classification and localization in the image processor may be performed using any of a variety of different techniques. A Viola-Jones object detection framework may be operated in real time by a parallel image processing engine in the image processor or by a separate connected or integrated parallel processing or neuromorphic processing engine. For Viola Jones, characteristic object features are detected in the image. These are combined to form integral images. The integral images are then tested by a cascaded sequence of classifiers to arrive at detected objects. Alternatively, a convolutional neural network (CNN) approach such as Faster Regional CNN or You Only Look Once type object detection, classification, and localization may be used. The CNN engine may include image buffers alternating with convolutional layers connected in a cascading sequence to produce a final object image or set of object images as outputs. These buffers and layers may be implemented in general purpose, graphics, or specialized neural network circuits. As mentioned above, the detected object is then tracked in the lidar point cloud.

The 3D modeling processor 116 combines the point cloud, the object classification and any other suitable system information to generate a 3D model 118 of the scene. This model will include any classified objects and the sizes and positions of the objects in three dimensions. The object classification allows the future behavior of the object to be predicted. As an example, a tree will remain stationary and the outer periphery of the tree will likely bend in a collision. A pedestrian may move in any direction at any time, but will never move very fast. The sizes and positions of the objects allows the scene to be fully characterized.

The 3D model 118 may be used for any of a variety of different purposes. In this example, the model is optionally provided to a vehicle navigation system 120. The vehicle navigation system is optionally coupled directly or indirectly to vehicle controls 122 to direct the vehicle on an intended path. The vehicle is referred to herein primarily as an automobile but the systems and methods described herein are not so limited. Any type of land vehicle whether it drives on roads, paths, guideways, tracks, or open areas, indoors or outdoors, may benefit from the sensor and scene modeling systems described herein. Water vehicles, such as boats, ships, or submarines and airborne vehicles may also benefit from the systems and methods described herein. In addition while the system is described as having a field of regard in a direction of forward travel, sensors may be directed in other directions and additional sensors may be used to observe multiple directions simultaneously. The 3D model may include objects in multiple different directions from the vehicle.

For simplicity, the description herein treats the camera and the lidar as if there is a direct and one-to-one correlation between the camera field of regard 110 and the lidar field of regard 106. In practice this is not necessary and may not be desired. There may be multiple cameras and multiple lidars and respective fields of view may not match. There may also be areas seen by a camera but not a lidar and vice versa. As an example, there may be multiple narrow field of view cameras to achieve the desired resolution for far distances. A high resolution camera with a wide field of view may be large and expensive compared to multiple narrower field of view cameras with the same resolution. Smaller cameras with smaller fields of view might be used to cover the lidar field of regard. Similarly, a lidar with a smaller field of regard may be able to perform a scan more quickly than a lidar with a wider field of regard. There may also be additional sensors for areas directly in front of a moving vehicle. Accordingly, the systems and methods herein may be adapted to suit different sensor suite designs.

Figure 2:
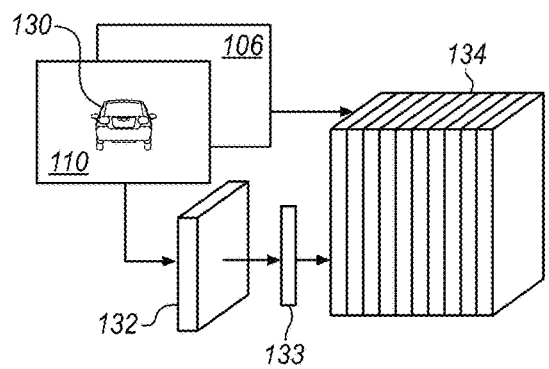
FIG. 2 is a diagram of applying objects in frames of a camera field of regard to a lidar point cloud.

FIG. 2 is a diagram of the scene as perceived by the camera and lidar systems. As shown, there is a lidar frame for the illustrated field of regard 106 and a camera frame for the field of regard 110. Both systems have captured a view of the scene and the back of a vehicle 130 appears in the scene in both of the frames and can be perceived by both systems. The lidar frame 106 is shown in 2D to allow it to be more easily compared to the camera frame 110. The diagram is greatly simplified so that there is only one object, however, there may be many more. The fields of regard of the frames 106, 110 are not perfectly aligned, as shown. In practice, the camera may cover only a small part of the lidar field of regard or vice versa and multiple cameras or lidars may be used to cover the entire scene as mentioned above. The optical systems may be adjusted to improve alignment and the physical mounting structures for the two systems may be configured to reduce independent movement of the two systems. However, with higher resolution, the precision of the alignment must also be improved. In embodiments, the two fields of view are calibrated and correction factors 133 may be determined to correlate frames of the camera with frames of the lidar.

The frames of the camera are typically 2D while the frames of the lidar are typically 3D. The lidar frames are used to generate a 3D point cloud 134 as mentioned above. The points in the point cloud each relate a reflection from the lidar received at a position on the lidar sensor to a 3D position in the frames of the lidar. When the camera system 115 classifies an object, that object may be represented as a 2D image 110 or 2D list of points or pixels that are included in the object. The set of points 132 of FIG. 2 may represent a buffer that contains the pixels of the entire image 110 or just the object 130. FIG. 2 shows this set of points 132 from the camera that are classified, e.g. as the back of a vehicle 130.

This position of this object in the camera frame is adjusted by correction factors 133 to correlate the camera frame to the lidar frame. The correction factors 133 may be stored in another memory as a single horizontal and vertical adjustment value for all pixels or as an array of factors to apply to different ones of the pixels 132. In other words, the pixels 132 of the object 130 are correlated to the 3D point cloud by applying the correction factors 133 to shift the pixel positions to corresponding pixel positions of the lidar point cloud 134. The selected pixels 132 may be presented as a matrix, table, or list and the correction factors may be one or more arithmetic or logarithmic factors that may be applied with a look-up table or a mapping table. This configuration may be in the image processor or the modeling processor. The adjusted position or points may then be applied to the 3D point cloud 134 from the lidar. Having updated the point cloud with the object classification, the modelling processor may then model all of the points of the object as a single object in the 3D model instead of as multiple independent points.

When the 2D shape of the object is correlated to the point cloud, the third dimension of distance or range may not be determined. If there is only one object in that 2D position of the 3D point cloud, then the all of the points for that 2D position may safely be assumed to correspond to the object. If there are multiple objects or disconnected points at different ranges in that 2D position, then the lidar or the modeling processor determines the range for the points that correspond to the object. In such a case, the distance of the object may also be determined using the lidar distance measurements represented by the point cloud. As a result, the size of the object and the distance to the object may also be determined using the point cloud.

In some cases, the 2D camera system may be able to determine the size of an object based on its classification and some reference image data. A vehicle might be sized based on its classification. A residential structure might be sized by assuming a standardized height for its entry door. However a tree or commercial building may not be easy to size without the lidar distance information. This size and distance information may then be used to improve the accuracy of the scene model.

For navigation purposes, the objects in the 3D model can be compared to an intended path through the model to determine whether there are any obstacles in that path. In embodiments, the model has free, occupied, and unknown space. Any of these three categories of space may include visible space and occluded space. The occupied space is occupied by objects. These objects may or may not be identified. The navigation system is designed to keep the vehicle in the free space and away from obstacles in the occupied space. As described below, there may also be unknown areas for which the system cannot determine whether the space is free or occupied. This may be because the area is occluded or for another reason. The navigation system may then direct the vehicle controls to cause the vehicle to avoid the obstacles while maintaining travel in the direction of the path. In an automobile, the controls may be accelerator, brakes, and steering to keep the automobile on the road and in a lane without colliding with any object in the lane.

Figure 3:
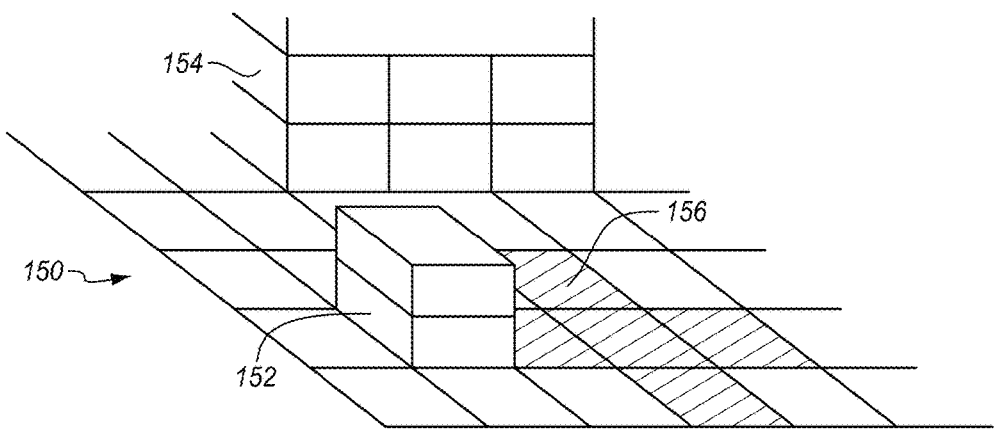
FIG. 3 is an isometric diagram of a scene model with occluded areas.

FIG. 3 is an isometric view diagram of a portion of a 3D model of a scene. The model may represent a roadway in front of an autonomous vehicle (not shown). The model is presented as a low-resolution grid with a predetermined resolution. The resolution may be adapted to suit the lidar point cloud data and the processing and memory capabilities in any particular implementation. In this case the model 150 has a vehicle 152 in front of the sensor and a building 154 to the side of the roadway. The 3D model provides height as well as position and depth. This may be useful if there are obstacles that are above the vehicle or below the vehicle or if the path does not have a level topography. The 3D model may also be useful for airborne or waterborne vehicles. The 3D model may have an occluded area 156 for which there is no current available data. The occluded area may be treated as occupied until more information is obtained.

If these objects are classified and correlated to points in the lidar, the points corresponding to the vehicle 152 in front of the sensor can be modeled as a single object so that tracking the movement of the points is computationally simpler. If the vehicle is moving, then it represents an obstacle but as a vehicle, the sensor can move down the roadway keeping a fixed distance to this obstacle with the expectation that deceleration of the vehicle is limited. If the other obstacle 154 to the side is classified as a building or wall then it will not have motion except with respect to the moving vehicle that carries the sensors and can be modeled as stationary on the grid. All of these objects are to be avoided by the vehicle as it travels down the roadway.

Figure 4:
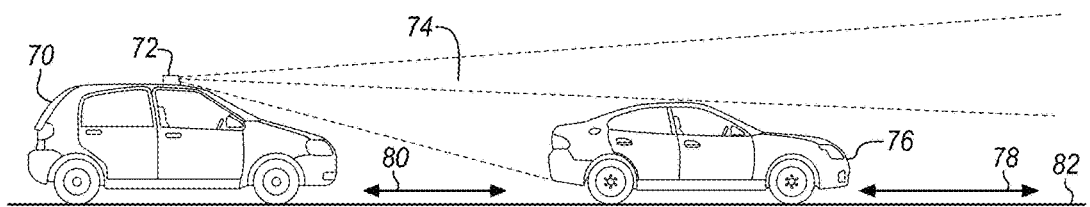
FIG. 4 is a side view diagram of a field of regard of a vehicle sensor system showing occluded areas.
Figure 5:
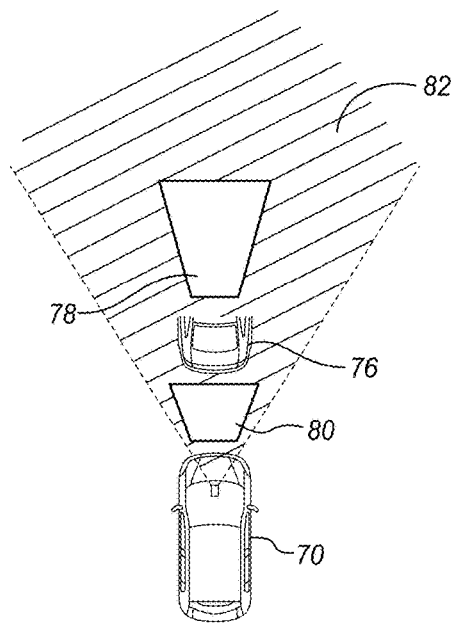
FIG. 5 is a top view diagram of the field of regard of FIG. 4.

FIG. 4 is an alternative side view diagram of a vehicle with a sensor system traveling along a roadway to show regions occluded from the sensor. FIG. 5 is a top view diagram of the same vehicle and sensor configuration. A first vehicle 170 has a forward-looking sensor or sensor suite 172 such as a lidar and visible light camera. The sensor suite has a field of regard 74 as indicated by ray trace lines. A second vehicle 176 is in the roadway in front of the first vehicle with a particular width and height.

The second vehicle 176 has a width and height that can be perceived by the sensor suite but the depth cannot be perceived as only the rear of the vehicle is visible. This is represented in FIG. 2 as the example rear of the vehicle 130 and in FIG. 3 as a vehicle 152 that has a depth of only one block in the grid. The vehicle has a width of one block and a height of two blocks. If the vehicle is classified as such, then the system can make an estimate of the depth of the vehicle. Most motor vehicles have a depth within a particular range. For example if the vehicle is 2 m wide, then the depth is likely to be about 5 m. This information may be useful for passing the vehicle or predicting occlusions and other data.

The second vehicle also occludes a portion of the roadway 178 that is in front of the second vehicle and to either side from the view of the sensor suite. The occluded portion of the scene may have been visible to the sensor earlier when the vehicles were farther away or when the second vehicle was in a different position. As a result, there may be data about the occluded portion in the 3D model using older data. If not, then the area may be fully or partially unknown space. There is a farther area 182 in front of the second vehicle that is not occluded by the sensor system. This area may be classified as known free space.

A second occluded portion 180 occurs immediately in front of the first vehicle but outside of the field of regard of the sensor suite on the first vehicle. This portion of the scene may have been sensed earlier when the vehicle was farther back on the roadway. If so, then this area may also be in the model.

FIGS. 4 and 5 show how a scene model 118, 150 might relate to the actual scene within the fields of view 106, 110 of the sensors in the scene modeling system 2. The model is generated by the modeling processor 116 based on the point cloud from the lidar but then additional information is added to it. As described herein object classification is added from the camera system 115 so that part of the point cloud is modeled as another vehicle or a roadway or a tree, for example. A navigation system 120 might add a path or destination to the model or other information about known objects in the scene from a map. There may be other sources of local or remote information that are added to the model.

Figure 6:
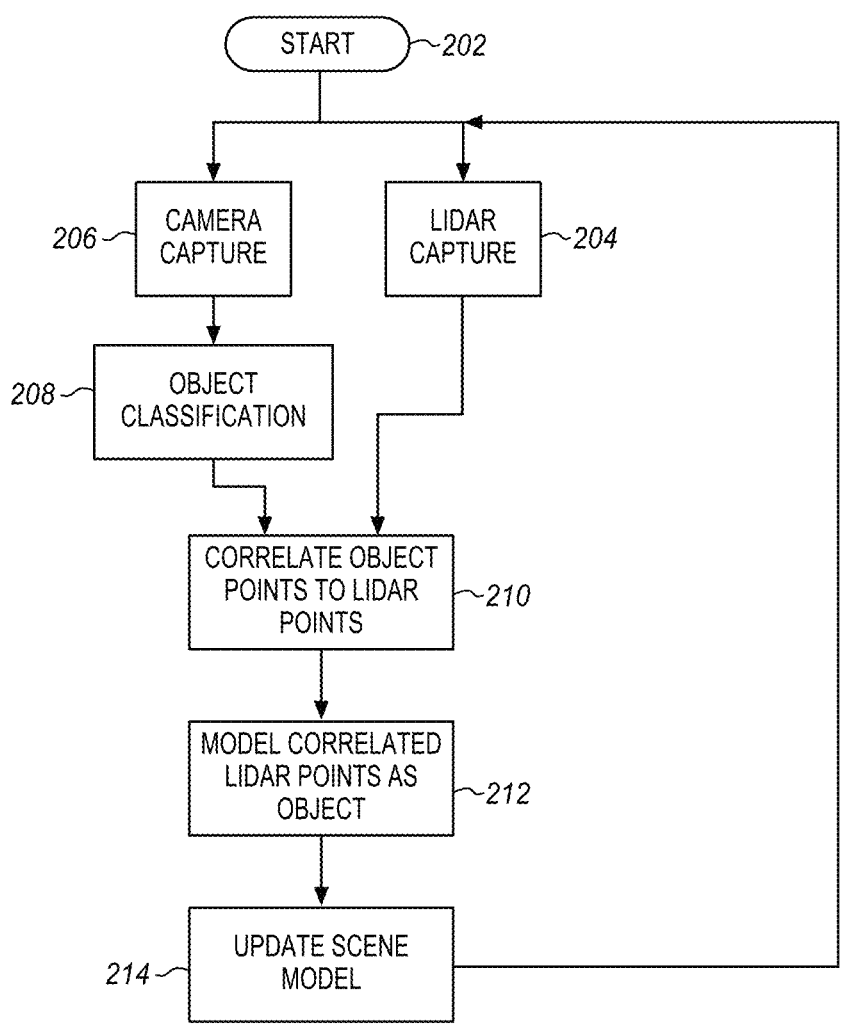
FIG. 6 is a process flow diagram of updating a scene model with classified objects.

FIG. 6 is a process flow diagram of using a camera system to augment a lidar system as described above. The system starts at 202 and lidar capture is activated 204 in a lidar system. The lidar captures data from which a point cloud may be generated. At the same time camera capture 206 is performed and object classification 208 is performed on the camera capture at the camera system, for example in the image processor that is configured with an object classification system.

The classified objects 208 and the lidar points are brought together in, for example, a modeling processor that is configured to correlate 210 points of classified objects to points of the lidar point cloud as shown in FIG. 2. The correlated lidar points, such as point cloud points, are then modeled 212 as objects in accordance with the classification. The scene model 118, 150 may then be updated 214 to include the objects from the camera capture. As described above, this model may then be used for navigation, scene understanding and other purposes.

As shown in this aspect of the system, an object is first detected 206 and classified 208 by a visible light camera system. The classified object is further refined 210 by the lidar system 204 to establish the precise size of the object. The object is used to update the 3D grid 214 and is modeled 212 frame to frame as a single object. This process is faster, more accurate, and requires less compute resources than attempting to classify the objects using lidar data alone.

Figure 7:
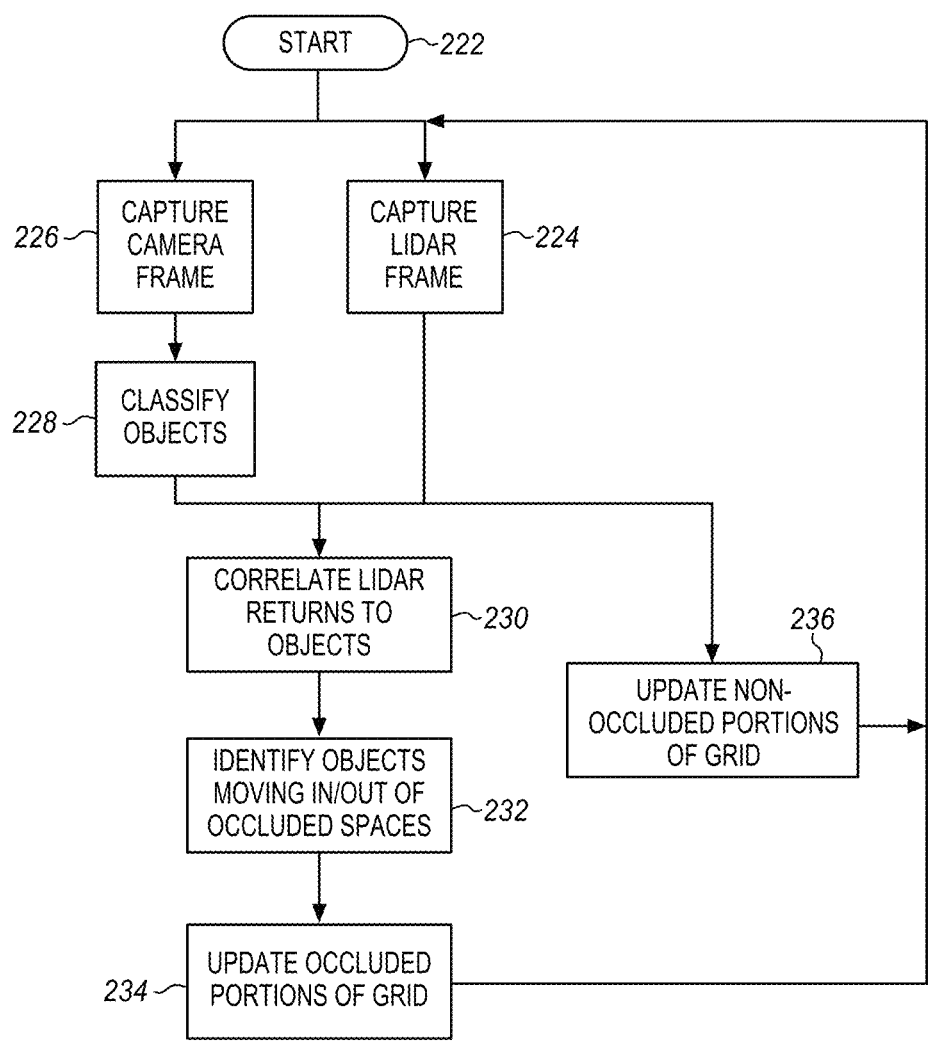
FIG. 7 is a process flow diagram of updating a scene model including occluded portions with classified objects.

FIG. 7 is an alternative process flow diagram of using a camera to augment a lidar scene modeling system. At 222 the grid model and the sensor system is initialized. At 224 the activated lidar system captures return data. In some instances the lidar will perform a sequence of e.g. horizontal scans of emitted laser pulses from the lidar and then capture any reflected return pulses on a imaging sensor through the full field of regard. The lidar then generates a frame of 3D return data based on a completed sequence of scans. This may be in the form of a lidar point cloud of 3D positions of returned reflections or in any other format.

At about the same time, the visible light camera system at 226 also captures frames that represent the same scene or an overlapping scene. These frames may be in the form of a 2D bitmap of color and pixel position or any other suitable format and are provided to an image processor or some other processing system to classify objects in the camera frames at 228. The camera data and the lidar data may then be combined, for example by a modeling processor configured to update 236 the non-occluded portions of the grid. This may be done, for example as shown in FIG. 6.

For the occluded portions of the grid, the modeling processor or another component of the system may also correlate 230 lidar returns to classified objects. Objects that are moving into and out of occluded spaces in the grid may be identified 232 as they move in the 3D model using the classifications and correlations. The occluded portions of the grid may then be updated 234 based on estimations of the behavior and size of the objects.

In this example, the object classifications in the 3D model are used to account for objects and spaces that may be temporarily occluded by other classified moving objects. For example, if part of a vehicle is observed while the remainder is occluded by an intervening object, the system can reasonably extrapolate that the unseen portions of the vehicle are present behind the occlusion. If the approximate size of the vehicle is known based on the classification and the observed size in the point cloud, then the size of the unseen portions may also be estimated.

As an alternative, this system can be built so that the camera data is provided to the lidar system so that the lidar system does the generating and modeling of the surrounding scene. The camera's contribution can be limited to the identification of candidate objects to be tracked as a group by the lidar system.

The camera system and the lidar system can be configured to be independent and even redundant so that in the event of a camera failure, the system performance would degrade to the current state of the art for lidar alone. In the event of a lidar failure a state of the art visible light camera system can be used. This provides independence for the two systems and an associated redundancy.

The described system takes advantage of the high quality, fast object classification from a visible light camera that may already be onboard for other purposes. The higher resolution and longer range lidar sensors require far more compute power to process the far larger amount of lidar data. This has a corresponding increase in cost and power consumption. By combining high quality classification from a camera with the data reduction in post processing of object models, a significant reduction in compute is possible. This comes with an increase in classification accuracy for higher performance.

The correlation of the objects as mentioned at 210, 230 may be done as shown in FIG. 2. The correction factors 133 may include a simple shift from a pixel position in the 2D image grid to a 2D pixel position in the 3D point cloud or the 3D model. As an example, each pixel may be shifted 2 pixels to the left and 12 pixels up. In this way, the correction or calibration factor also serves as a mapping function. The same type of mapping may also be used if there are multiple cameras to cover the field of regard of the lidar or multiple lidars to cover the field of regard of a single camera. Each camera or each lidar would have a different mapping function 133 to map the camera objects into the lidar point field. This mapping function may be a simple 2D position adjustment or there may be different adjustments for different positions in the field of regard so that there is a full matrix of functions for each pixel or a factor to be applied with distance from the center of the 2D camera image.

The object localization may be improved if the camera system provides a range or distance in addition to pixel positions. In any scene there may be objects that occur in the same position in a 2D scene. These objects may be positioned so that one is front of the other or so that one is visible through a window of another.

As mentioned above, this may be done using a depth camera system, but it may also be done using the object classification. Many common objects, such as pedestrians, bicycles, vehicles, etc. have a limited range of possible sizes. The image processor or modeling processor can use an estimated size and compare this size to the size of the image of the object in the field of regard. This can then be used to estimate a distance from the sensor to the object.

Figure 8:
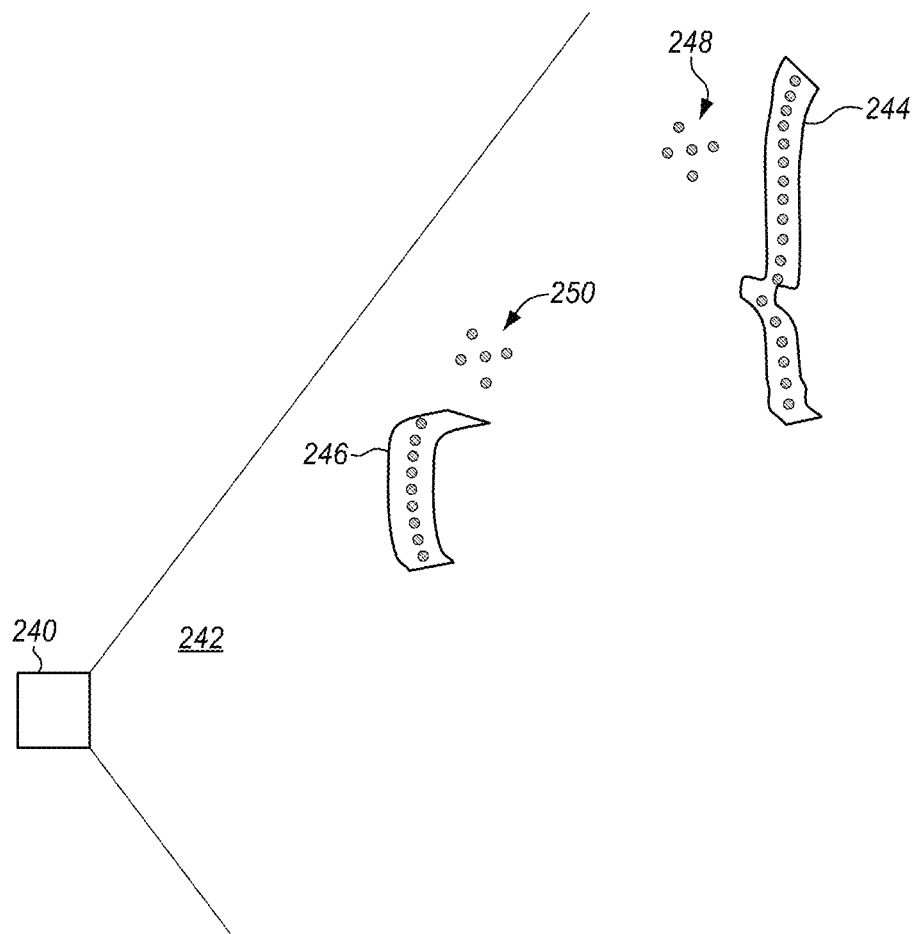
FIG. 8 is a top view diagram of point gates and isolated points in a field of regard of a vehicle sensor system.

FIG. 8 shows an example of two vehicles 244, 246 within the field of regard 242 of a sensor system 240. The far object 244 has been classified as a side of a vehicle. The vehicle fills a certain number of pixels or may be described as filling, for example, 15 degrees of azimuth and 2 degrees of elevation. These angles are with respect to the sensor 240 within its field of regard. This apparent size in the image can be compared to the anticipated size of the vehicle, e.g. 5 m long and 1.5 m high. To fill 15 degrees of azimuth and be 5 m long, the vehicle should be 6 m from the sensor. This range of 6 m may be obtained from a simple factoring or triangulation of the azimuth with the distance. Similarly the second object has been classified as the rear of a vehicle 246 which fills a certain azimuth and elevation and is therefore 2 m in range.

Both objects may be provided to the 3D model with a corrected or adjusted height, and width, and an estimated distance. This allows all of the points in the camera image at that distance to be attached to that distance in the point cloud. Other points at other distances are not attached to the object. As an example in FIG. 8 there is a set of points 248 in the 3D model that are closer to the sensor and that are not a part of the side of the vehicle. These points may be a part of another vehicle, a sign, a pedestrian, birds, or any other object between the vehicle and the sensor. By providing the range to the vehicle, the 3D model is able to exclude these points from the object in the 3D model. A similar set of points 250 is even closer to the sensor and also not part of either vehicle.

Figure 9:
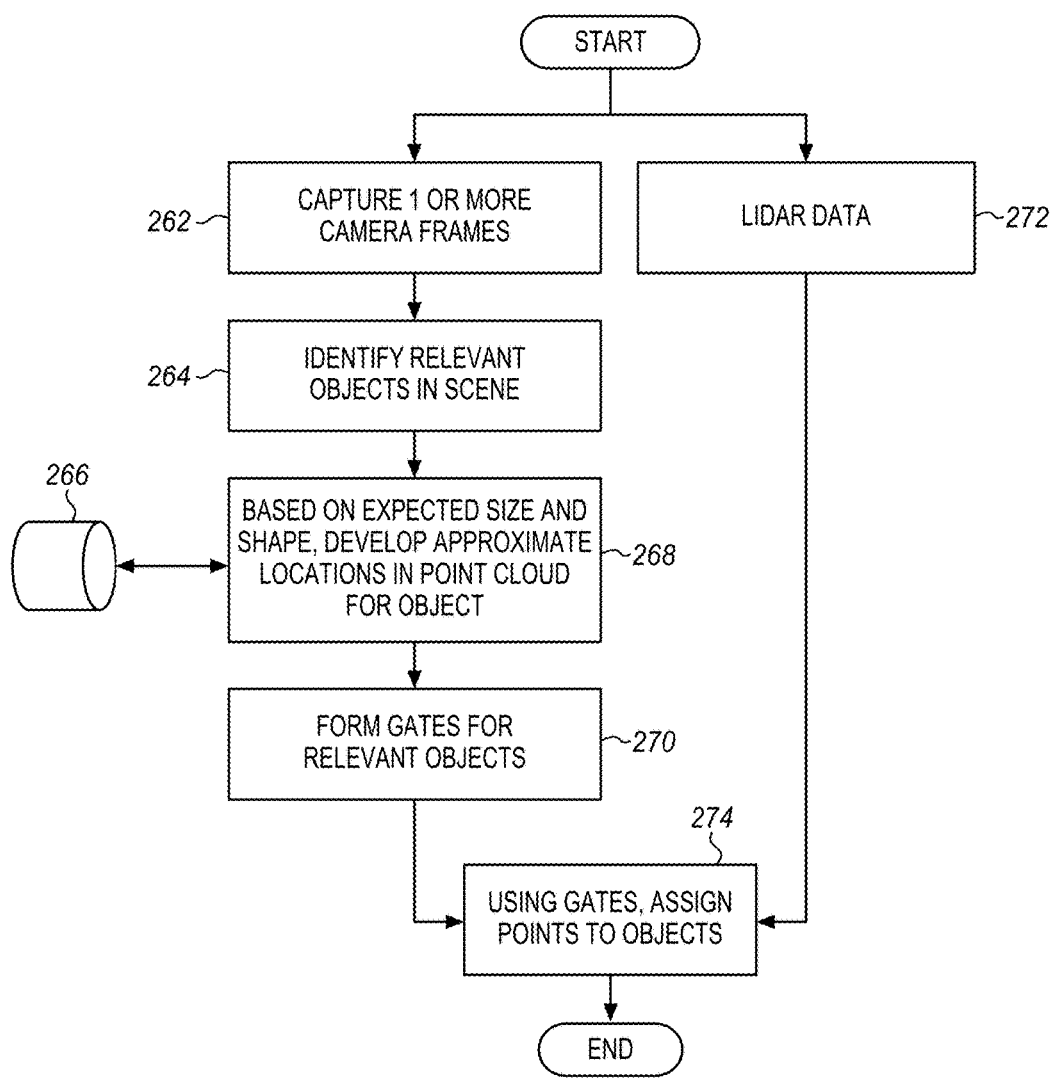
FIG. 9 is a process flow diagram of using gates to assign points to objects of a scene model.

FIG. 9 is a process flow diagram of using this ranging data to assign points in the 3D point cloud from the lidar to appropriate objects. Such a process may be performed by the camera using the image processor or another appropriate processing resource. At 262 camera frames are captured. At 264 objects in the scene are detected, classified and localized as described above. The system includes a memory or data store 266 with expected size and shapes of objects that can be classified. The same memory may be used to store training data or templates for any of the objects for use in classification.

At 268 the expected size of the classified objects that are stored in the memory 266 are compared to the apparent size of the object in the camera frame. The difference between the expected and the apparent size is factored to generate a range from the sensor to the object. In some cases, the expected size may be very precise, in other cases, the expected size may have significant uncertainty. The uncertainty can be factored into the range so that the range also has an uncertainty.

At 272 the lidar also captures frames which are used to generate a 3D point cloud or a 3D model of the scene in front of the lidar or both. At 274 the localized camera objects including the range are then assigned to points in the 3D point cloud or the 3D model. Any uncertainty in any position or dimension of the object can be accommodated using gates. The lidar measures the distance from the sensor to objects in the scene using time-of-flight and similar techniques. With each measurement there is an uncertainty as to the precise distance and the precise position of each reflection that goes into a pixel. The uncertainty establishes a gate. The maximum and minimum of the range gate sets forth the uncertainty in the range to the object. There may also be horizontal and vertical gates.

In the example of FIG. 8, the side of the car 244 is shown as a sequence of points. In this view the horizontal extent of the azimuth range of the points is seen, the vertical extent is not seen. For each of the points there is also a gate as indicated by the solid line drawn around all of the points. The horizontal gate indicates that any of the points can be at any position within the solid line and between two other points. The gates for all three dimensions (horizontal, vertical, range) are provided to the model processor. The model processor then maps these positions within the gates to points of the point cloud or positions of the 3D model.

Self-driving or "autonomous" vehicles generally employ sensors, such as light detection and ranging (lidar) devices, to detect or "see" the surrounding environment as the vehicles move toward their destinations. Such vehicles include self-driving control systems that process the sensor data and, based on both the sensed environment and the desired destination, determine which maneuvers and operational states (e.g., speed, braking force, steering direction) are most appropriate on a more or less continuous basis throughout the trip. The principles and systems described herein may be applied to self-driving or autonomous vehicles among other uses. The systems described below show additional details of the systems above including more detail for some of the systems and alternatives to some of the systems above. The features of these systems may be combined in various ways to suit particular applications.

Figure 10:
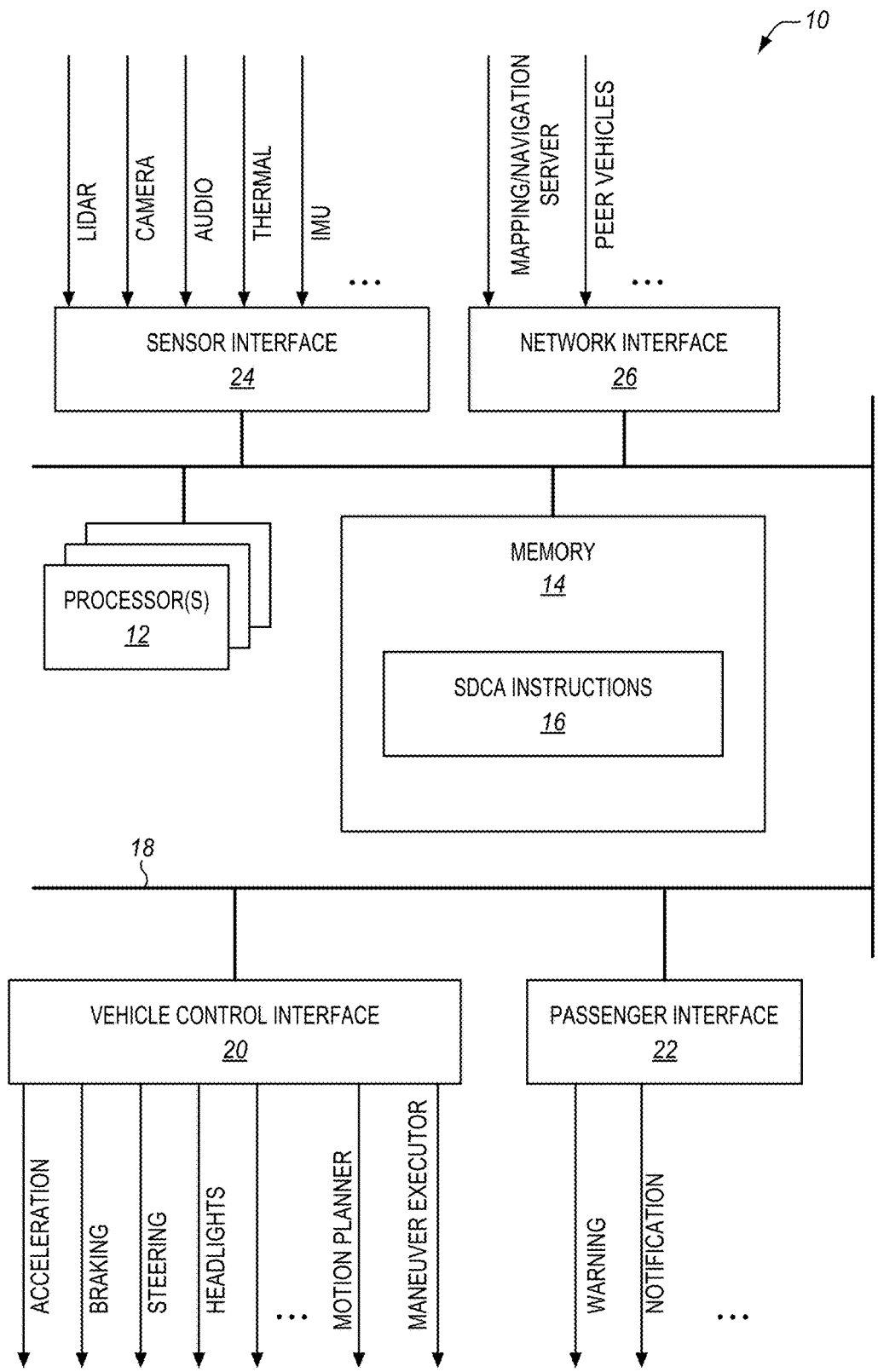
FIG. 10 is block diagram of an example computing system for controlling and/or operating an autonomous vehicle.

FIG. 10 includes a block diagram of an example computing system 10 for controlling and/or operating an autonomous vehicle. The computing system 10 may be integrated within an autonomous vehicle in any suitable manner, and at any suitable location or locations within the vehicle. For example, the computing system 10 may be included, or partially included, within a vehicle controller that is on-board an autonomous vehicle, where the vehicle controller controls and/or operates at least some of the vehicle's driving subsystems that include mechanical components (e.g., accelerator, brakes, steering mechanism, lights, etc.) in a fully- or semi-autonomous manner. The computing system 10 includes one or more processors 12 and one or more tangible, non-transitory memories 14 storing thereon vehicle subsystem control and/or operation instructions 16, which are referred to herein as self-driving control architecture ("SDCA") instructions 16. Generally speaking, the SDCA instructions 16 generate decisions for controlling various operations, behaviors, and maneuvers of the autonomous vehicle.

In embodiments where the processor(s) 12 include more than a single processor, each processor may be a different programmable microprocessor that executes software instructions stored in the memory 14. Alternatively, each of the processor(s) 12 may be a different set of such microprocessors, or a set that includes one or more microprocessors and one or more other processor types (e.g., ASICs, FPGAs, etc.) for certain functions.

The memory 14 may include one or more physical memory devices with non-volatile memory. Any suitable memory type or types may be used, such as ROM, solid-state drives (SSDs), hard disk drives (HDDs), and so on. The processor(s) 12 are coupled to the memory 14 via a bus or other network 18. The network 18 may be a single wired network or may include any suitable number of wired and/or wireless networks. For example, the network 18 may be or include a controller area network (CAN) bus, a Local Interconnect Network (LIN) bus, and so on.

Also coupled to the network 18 are a vehicle control interface 20, a passenger interface 22, a sensor interface 24, and a network interface 26. Each of the interfaces 20, 22, 24 and 26 may include one or more processors (e.g., ASICs, FPGAs, microprocessors, etc.) and/or other hardware, firmware and/or software to enable communication with systems, subsystems, devices, etc., that are external to the computing system 10.

The vehicle control interface 20 is generally configured to provide control data generated by the processor(s) 12 executing the SDCA instructions 16 to the appropriate operational subsystems of the autonomous vehicle, such that the appropriate subsystems can effectuate driving decisions made by the processor(s) 12. For example, the vehicle control interface 20 may provide control signals to the appropriate driving-related subsystem(s) that include mechanical components, e.g., accelerator, brakes, steering mechanism, lights, etc. As another example, the vehicle control interface 20 may output or signals to appropriate subsystem(s) that plan the motion of the vehicle (e.g., a motion planner), and/or that control the execution of driving maneuvers (e.g., a maneuver executor). In some embodiments, the vehicle control interface 20 includes separate interface hardware, firmware and/or software for different operational subsystems.

The passenger interface 22 is generally configured to provide alerts, warnings, notifications, and/or other information to one or more passengers of the autonomous vehicle. In some embodiments where the vehicle is not fully autonomous (e.g., allowing human driving in certain modes and/or situations), the interface 22 may specifically provide such information to the driver (e.g., via dashboard indicators, etc.). As just one example, the passenger interface 22 may cause a display and/or speaker in the vehicle to generate an alert when the processor(s) 12 (executing the SDCA instructions 16) determine that a collision with another object is likely. As another example, the passenger interface 22 may cause a display in the vehicle to show an estimated time of arrival (ETA) to passengers. In some embodiments, the passenger interface 22 also permits certain user inputs. If the vehicle supports passenger selection of specific driving styles, for example, the passenger interface 22 may cause a display to present a virtual control (e.g., button) that a passenger may activate (e.g., touch, scroll through, etc.) to select a particular driving style.

The sensor interface 24 is generally configured to convert raw sensor data obtained by one or more sensor devices (e.g., lidar, camera, microphones, thermal imaging units, IMUS, etc.) to a format that is consistent with a protocol of the network 18 and that is recognized by one or more of the processor(s) 12. The sensor interface 24 may be coupled to an on-board lidar system and/or other type of active sensing system, for example, with the sensor interface 24 converting point cloud data generated by such system(s) into an appropriate format. In some embodiments, the sensor interface 24 includes separate interface hardware, firmware and/or software for each sensor device and/or each sensor type.

The network interface 26 is generally configured to convert data received from one or more devices or systems external to the autonomous vehicle to a format that is consistent with a protocol of the network 18 and is recognized by one or more of the processor(s) 12. In some embodiments, the network interface 26 includes separate interface hardware, firmware and/or software for different external sources. For example, a remote mapping/navigation server may send mapping and navigation/route data (e.g., mapping and navigation signals) to the computing system 10 via a first type of wireless network interface included the network interface 26, e.g., a cellular network interface, while one or more peer vehicles (e.g., other autonomous vehicles) may send data (e.g., current positions of the other vehicles) to the computing system 10 via a different type of wireless network interface included in the network interface 26, e.g., a Wi Fi network interface. Other types of external data may also, or instead, be received via the network interface 26. For example, the computing system 10 may use the network interface 26 to receive data representing rules or regulations (e.g., speed limits), object positions (e.g., road rails, overhanging signage, etc.), and/or other information from various infrastructure devices or systems.

In some embodiments, no sensor data (or only limited sensor data) of the autonomous vehicle is received via the sensor interface 24. Instead, the processor(s) 12 execute the SDCA instructions 16 using, as input, only (or primarily) data that is received by the network interface 26 from other vehicles, infrastructure, and/or other external devices/systems. In such an embodiment, the external data may include raw sensor data that is indicative of the vehicle environment (but was generated off-board the vehicle), and/or may include higher-level information that was generated externally using raw sensor data (e.g., occupancy grids).

Although not illustrated in FIG. 10, the network 18 may also couple to other types of interfaces and/or components. Additionally, in some embodiments, one or more of the interfaces shown in FIG. 10 may be omitted (e.g., the sensor interface 14, as discussed above). Moreover, it is understood that the computing system 10 represents just one possible configuration for supporting the software architectures, functions, features, etc., described herein, and that others are also within the scope of this disclosure.

Figure 11:
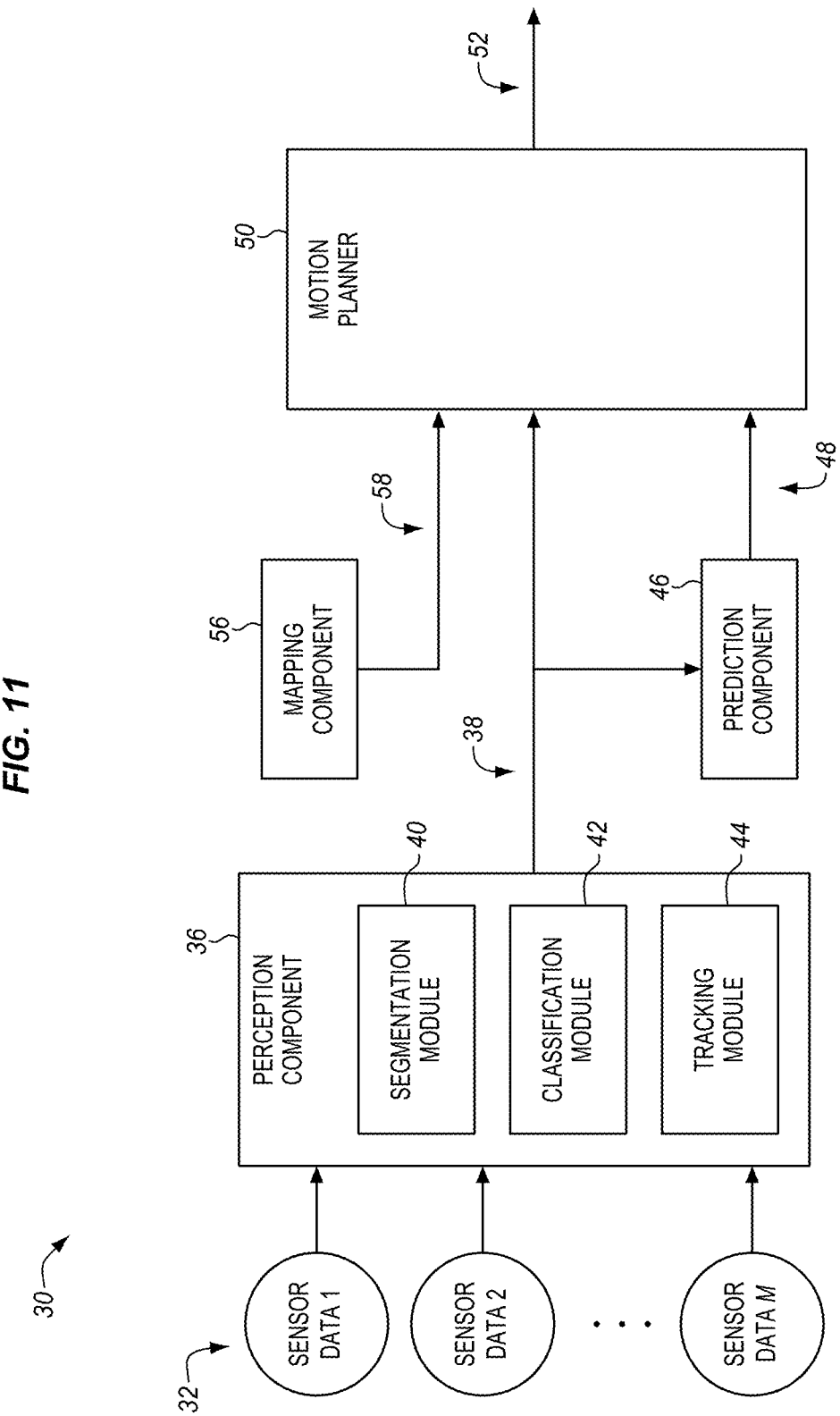
FIG. 11 is a block diagram of an example self-driving control architecture (SDCA) of an autonomous vehicle.

FIG. 11 illustrates an example self-driving control architecture (SDCA) 30 of an autonomous vehicle. Generally speaking, a SDCA 30 may generate instructions for controlling various operations and maneuvers of an autonomous vehicle. The SDCA 30 may be implemented by the SDCA instructions 16 of FIG. 10, in an embodiment. The SDCA 30 receives as input M sets of sensor data 32 generated by M different sensors, with M being any suitable integer equal to or greater than one. The sensor data 32 may be received via the sensor interface 24 of FIG. 10, in an embodiment. As just one example, "sensor data 1" may include frames of point cloud data generated by a first lidar device, "sensor data 2" may include frames of point cloud data generated by a second lidar device, "sensor data 3" (as indicated by the ellipsis) may include frames of digital images generated by a camera, and so on. As discussed above with respect to FIG. 10, the sensors may include one or more lidar devices, cameras, radar devices, thermal imaging units, IMUs, and/or other sensor types. Generally speaking, the SDCA 30 is configured to process point cloud data and, in some embodiments, is also configured to process two-dimensional image data, such as camera data.

The sensor data 32 is input to a perception component 36 of the SDCA 30, and is processed by the perception component 36 to generate perception signals 38 descriptive of a current state of the environment in which the autonomous vehicle is located. It is understood that the term "current" may actually refer to a very short time prior to the generation of any given perception signals 38, e.g., due to the short processing delay introduced by the perception component 36 and other factors. To generate the perception signals, the perception component may include a segmentation module 40, a classification module 42, and a tracking module 44.

The segmentation module 40 is generally configured to identify distinct objects within the sensor data representing the sensed environment. Depending on the embodiment and/or scenario, the segmentation task may be performed separately for each of a number of different types of sensor data, or may be performed jointly on a fusion of multiple types of sensor data. In some embodiments where lidar devices are used, the segmentation module 40 analyzes frames that include point cloud datasets therein to identify subsets of points within each frame that correspond to probable physical objects located in the environment. In other embodiments, the segmentation module 40 jointly analyzes lidar point cloud data frames in conjunction with camera image frames to identify objects that are located in the environment. Other suitable techniques, and/or data from other suitable sensor types, may also be used to identify objects. It is noted that, as used herein, references to different or distinct "objects" may encompass physical things that are entirely disconnected (e.g., with two vehicles being two different "objects," and the road on which the vehicles are traveling as yet a different "object"), as well as physical things that are connected or partially connected (e.g., with a vehicle being a first "object" and the vehicle's hitched trailer being a second "object"). The segmentation module 40 may use predetermined rules or algorithms to identify objects. For example, the segmentation module 40 may identify as distinct objects, within a point cloud, any clusters of points that meet certain criteria (e.g., having no more than a certain maximum distance between the points in the cluster, or having the same relative velocity). As another example, the segmentation module 40 may utilize one or more neural networks that have been trained to identify distinct objects within the environment (e.g., using supervised learning with generated labels for different objects within test data point clouds, etc.), or may utilize one or more other types of machine-learning based models that have been trained, by using test or training data, to discern, distinguish, and/or identify probably distinct objects within a source image.

The classification module 42 is generally configured to determine classes (labels, categories, etc.) for different objects that have been identified or distinguished by the segmentation module 40. Like the segmentation module 40, the classification module 42 may perform classification separately for different sets of the sensor data 32, or may classify objects based on data from multiple sensors, etc. Moreover, and also similar to the segmentation module 40, the classification module 42 may utilize one or more neural networks or other machine-learning based models to classify objects, where the neural networks and/or machine-learning models have been trained, by using a set of test or training data, to perform object classification.

The tracking module 44 is generally configured to track distinct objects over time (e.g., across multiple lidar point cloud or camera image frames). The tracked objects are generally objects that have been identified by the segmentation module 40, but may or may not be objects that were classified by the classification module 42, depending on the embodiment and/or scenario. The segmentation module 40 may assign identifiers to identified objects, and the tracking module 44 may associate existing identifiers with specific objects where appropriate (e.g., for lidar data, by associating the same identifier with different clusters of points, at different locations, in successive point cloud frames). Like the segmentation module 40 and the classification module 42, the tracking module 44 may perform separate object tracking based on different sets of the sensor data 32, or may track objects based on data from multiple sensors. Moreover, and also similar to the segmentation module 40 and the classification module 42, the tracking module 44 may utilize one or more neural networks or other machine-learning models to track objects, where the neural networks and/or machine-learning models have been trained, by using a set of test or training data, to perform object tracking across frames and/or images.

The SDCA 30 also includes a prediction component 46, which processes the perception signals 38 to generate prediction signals 48 descriptive of one or more predicted future states of the autonomous vehicle's environment. For a given object, for example, the prediction component 46 may analyze the type/class of the object (as determined by the classification module 42) along with the recent tracked movement of the object (as determined by the tracking module 44) to predict one or more future positions of the object. As a relatively simple example, the prediction component 46 may assume that any moving objects will continue to travel on their current direction and with their current speed, possibly taking into account first- or higher-order derivatives to better track objects that have continuously changing directions, objects that are accelerating, and so on. In some embodiments, the prediction component 46 also predicts movement of objects based on more complex behaviors. For example, the prediction component 46 may assume that an object that has been classified as another vehicle will follow rules of the road (e.g., stop when approaching a red light), and will react in a certain way to other dynamic objects (e.g., attempt to maintain some safe distance from other vehicles). The prediction component 46 may inherently account for such behaviors by utilizing a neural network or other machine learning model, for example. The prediction component 46 may be omitted from the SDCA 30, in some embodiments.

In some embodiments, the perception signals 38 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 42, possibly with an "unknown" class for certain pixels that were not successfully classified. Similarly, the prediction signals 48 may include, for each such grid generated by the perception component 36, one or more "future occupancy grids" that indicate predicted object positions, boundaries and/or orientations at one or more future times (e.g., 1, 2 and 5 seconds ahead).

A mapping component 56 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 58. In some embodiments, the mapping and navigation signals 58 include other map- or location-related information, such as speed limits, traffic indicators, and so on. The signals 58 may be obtained from a remote server (e.g., via a cellular or other communication network of the autonomous vehicle, or of a smartphone coupled to the autonomous vehicle, etc.), and/or may be locally stored in a persistent memory of the autonomous vehicle.

A motion planner 50 processes the perception signals 38, the prediction signals 48, and the mapping and navigation signals 58 to generate decisions 52 regarding the next movements of the autonomous vehicle. Depending on the type of the motion planner 50, the decisions 52 may include operational parameters (e.g., braking, speed and steering parameters) and/or particular maneuvers (e.g., turn left, move to right lane, move onto shoulder of road, etc.). The decisions 52 may be provided to one or more operational subsystems of the autonomous vehicle (e.g., if the decisions 52 indicate specific operational parameters for subsystems that include mechanical components, such as steering mechanisms, accelerator, brakes, lights, etc.), or may be provided to one or more intermediate stages that convert the decisions 52 into operational parameters (e.g., if the decisions indicate specific maneuvers to be performed by a maneuver executor).

The motion planner 50 may utilize any suitable type(s) of rules, algorithms, heuristic models, machine learning models, or other suitable techniques to make driving decisions based on the perception signals 38, prediction signals 48, and mapping and navigation signals 58. For example, the motion planner 50 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on. In some embodiments, the motion planner 50 includes multiple, different motion planner types in order to provide a more diverse set of mechanisms for generating driving decisions, and thereby improve safety and/or other performance aspects of the autonomous vehicle.

Light detection and ranging (lidar) is a technology that can be used to measure distances to remote targets. Typically, a lidar system includes a light source and an optical receiver. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

Figure 12:
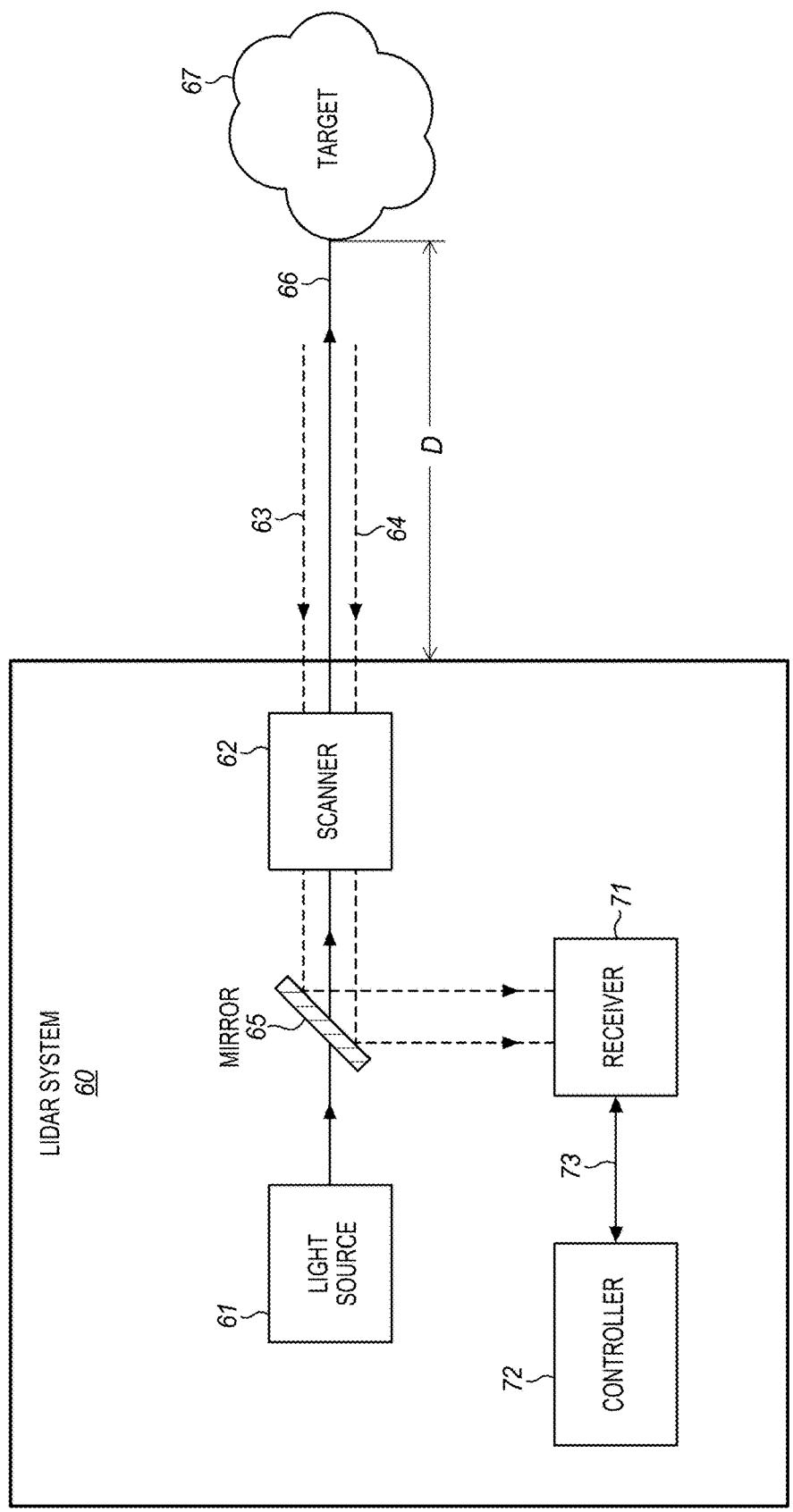
FIG. 12 is a block diagram of an example light detection and ranging (lidar) system.

FIG. 12 illustrates an example light detection and ranging (lidar) system 60. In particular embodiments, a lidar system 60 may include a light source 61, mirror 65, scanner 62, receiver 71, or controller 72. The light source 61 may include, for example, a laser which emits light having a particular operating wavelength in the infrared, visible, or ultraviolet portions of the electromagnetic spectrum. The light source 61 emits an output beam of light 66 which may be continuous wave (CW), pulsed, or modulated in any suitable manner for a given application. The output beam of light 66 is directed downrange toward a remote target 67.

Once the output beam 66 reaches the downrange target 67, the target may scatter or reflect at least a portion of light from the output beam 66, and some of the scattered or reflected light may return toward the lidar system 60. In the example of FIG. 1, the scattered or reflected light is represented by input beam 63, 64 which passes through scanner 62 and is reflected by mirror 65 and directed to receiver 71. In particular embodiments, a relatively small fraction of the light from output beam 66 may return to the lidar system 60 as input beam 63, 64.

In particular embodiments, receiver 71 may receive or detect photons from input beam 63, 64 and generate one or more representative signals. For example, the receiver 71 may generate an output electrical signal 73 that is representative of the input beam 63, 64 and the electrical signal 73 may be sent to controller 72. In particular embodiments, receiver 71 or controller 72 may include a processor, computing system (e.g., an ASIC or FPGA), or other suitable circuitry. A controller 72 may be configured to analyze one or more characteristics of the electrical signal 73 from the receiver 71 to determine one or more characteristics of the target 67, such as its distance downrange from the lidar system 60. This can be done, for example, by analyzing the time of flight or phase modulation for a beam of light 66 transmitted by the light source 61. If lidar system 60 measures a time of flight of T (e.g., T represents a round-trip time of flight for an emitted pulse of light to travel from the lidar system 60 to the target 67 and back to the lidar system 60), then the distance D from the target 67 to the lidar system 100 may be expressed as $D = c \cdot T/2$, where c is the speed of light (approximately $3.0 \times 10^8$ m/s).

In particular embodiments, lidar system 60 may include a scanner 62 configured to scan an output beam 66 across a field of regard of the lidar system 60. As an example, scanner 62 may include one or more scanning mirrors configured to pivot, rotate, oscillate, or move in an angular manner about one or more rotation axes. The output beam 66 may be reflected by a scanning mirror, and as the scanning mirror pivots or rotates, the reflected output beam 66 may be scanned in a corresponding angular manner.

In particular embodiments, a scanning mirror may be attached to a scanner actuator or mechanism which pivots or rotates the mirror over a particular angular range. A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism.

In particular embodiments, scanner 62 may be configured to scan the output beam 66 (which may include at least a portion of the light emitted by light source 61) across a field of regard of the lidar system 60. A field of regard (FOR) of a lidar system 60 may refer to an area, region, or angular range over which the lidar system 60 may be configured to scan or capture distance information. In other embodiments, scanner 62 may be configured to direct the output beam 66 towards specific points in the FOR rather than scanning the output beam across the entire FOR, reducing the number of points captured by the lidar system.

In particular embodiments, a lidar system 60 may be used to determine the distance to one or more downrange targets 67. By scanning the lidar system 60 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. In particular embodiments, lidar system 60 may be configured to repeatedly capture or generate point clouds of a field of regard at any suitable frame rate. In particular embodiments, a point-cloud frame rate may be substantially fixed, or a point-cloud frame rate may be dynamically adjustable.

Although this disclosure describes or illustrates example embodiments of lidar systems 60 or light sources 61 that produce light waveforms that include pulses of light, the embodiments described or illustrated herein may also be applied to other types of light waveforms, including continuous-wave (CW) light or modulated light waveforms. For example, a lidar system 60 as described or illustrated herein may include a light source 61 configured to produce pulses of light. Alternatively, a lidar system 60 may be configured to act as a frequency-modulated continuous-wave (FMCW) lidar system and may include a light source 61 configured to produce CW light or a frequency-modulated light waveform.

Although FIG. 12 utilizes one or more scanning mirrors to target the output beam, other embodiments of lidar system 60 may be used. In particular embodiments, lidar system 60 may be a flash lidar that captures an entire FOR with a single laser flash. In other embodiments, lidar system 60 may use lasers that are coupled to a mechanically rotating platform.

Figure 13:
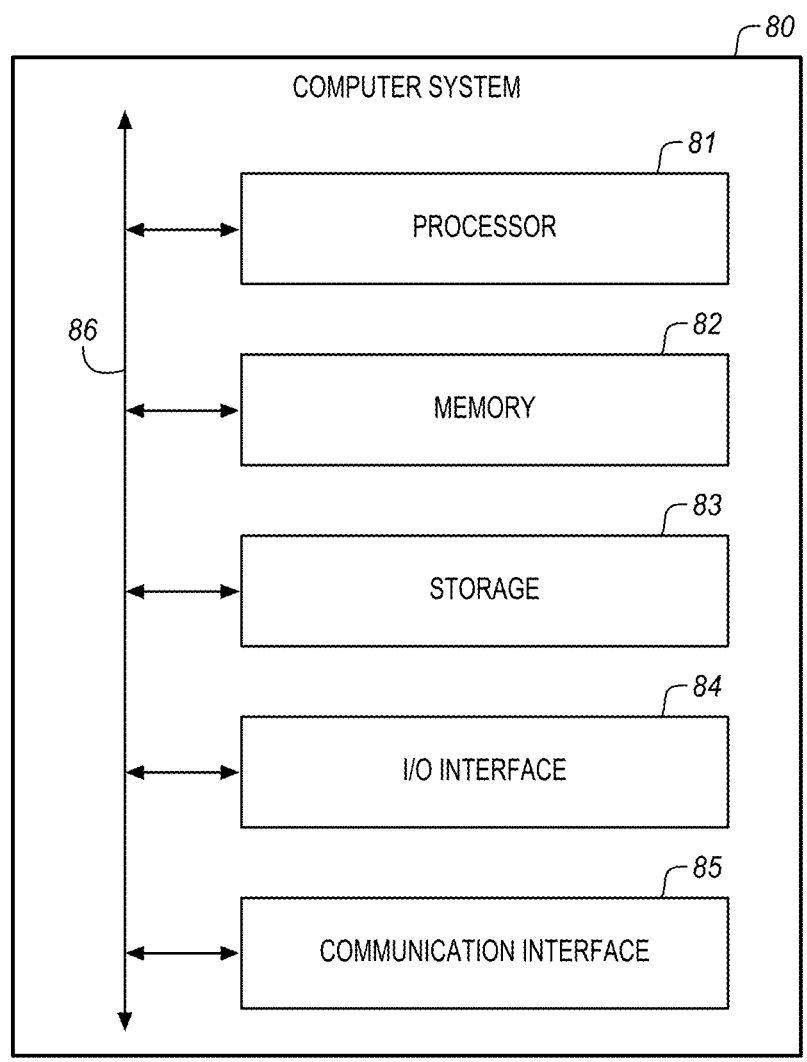
FIG. 13 is a block diagram of an example computer system.

FIG. 13 illustrates an example computer system 80. In particular embodiments, one or more computer systems 80 may perform one or more steps of one or more methods described or illustrated herein. In particular embodiments, one or more computer systems 80 may provide functionality described or illustrated herein. In particular embodiments, software running on one or more computer systems 80 may perform one or more steps of one or more methods described or illustrated herein or may provide functionality described or illustrated herein. Particular embodiments may include one or more portions of one or more computer systems 80. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 80 may take any suitable physical form. As an example, computer system 80 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 80 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 80 may include one or more computer systems 80; be unitary or distributed; span multiple locations; span multiple machines; span multiple data centers; or reside in a cloud, which may include one or more cloud components in one or more networks. Where appropriate, one or more computer systems 80 may perform without substantial spatial or temporal limitation one or more steps of one or more methods described or illustrated herein. As an example, one or more computer systems 80 may perform in real time or in batch mode one or more steps of one or more methods described or illustrated herein. One or more computer systems 80 may perform at different times or at different locations one or more steps of one or more methods described or illustrated herein, where appropriate.

As illustrated in the example of FIG. 13 computer system 80 may include a processor 81, memory 82, storage 83, an input/output (I/O) interface 84, a communication interface 85, or a bus 86. Computer system 80 may include any suitable number of any suitable components in any suitable arrangement.

In particular embodiments, processor 81 may include hardware for executing instructions, such as those making up a computer program. As an example, to execute instructions, processor 81 may retrieve (or fetch) the instructions from an internal register, an internal cache, memory 82, or storage 83; decode and execute them; and then write one or more results to an internal register, an internal cache, memory 82, or storage 83. In particular embodiments, processor 81 may include one or more internal caches for data, instructions, or addresses. Processor 81 may include any suitable number of any suitable internal caches, where appropriate. As an example, processor 81 may include one or more instruction caches, one or more data caches, or one or more translation lookaside buffers (TLBs). Instructions in the instruction caches may be copies of instructions in memory 82 or storage 83, and the instruction caches may speed up retrieval of those instructions by processor 81. Data in the data caches may be copies of data in memory 82 or storage 83 for instructions executing at processor 81 to operate on; the results of previous instructions executed at processor 81 for access by subsequent instructions executing at processor 81 or for writing to memory 82 or storage 83; or other suitable data. The data caches may speed up read or write operations by processor 81. The TLBs may speed up virtual-address translation for processor 81. In particular embodiments, processor 81 may include one or more internal registers for data, instructions, or addresses. Processor 81 may include any suitable number of any suitable internal registers, where appropriate. Where appropriate, processor 81 may include one or more arithmetic logic units (ALUs); may be a multi-core processor; or may include one or more processors 81. In particular embodiments, processor 81 may be a general-purpose single- or multi-chip processor, a digital signal processor (DSP), an ASIC, a FPGA, any other suitable programmable-logic device, discrete gate or transistor logic, discrete hardware components, or any suitable combination thereof.

In particular embodiments, memory 82 may include main memory for storing instructions for processor 81 to execute or data for processor 81 to operate on. As an example, computer system 80 may load instructions from storage 83 or another source (such as, for example, another computer system 80) to memory 82. Processor 81 may then load the instructions from memory 82 to an internal register or internal cache. To execute the instructions, processor 81 may retrieve the instructions from the internal register or internal cache and decode them. During or after execution of the instructions, processor 81 may write one or more results (which may be intermediate or final results) to the internal register or internal cache. Processor 81 may then write one or more of those results to memory 82. One or more memory buses (which may each include an address bus and a data bus) may couple processor 81 to memory 82. Bus 86 may include one or more memory buses. In particular embodiments, one or more memory management units (MMUs) may reside between processor 81 and memory 82 and facilitate accesses to memory 82 requested by processor 81. In particular embodiments, memory 82 may include random access memory (RAM). This RAM may be volatile memory, where appropriate. Where appropriate, this RAM may be dynamic RAM (DRAM) or static RAM (SRAM). Memory 82 may include one or more memories 82, where appropriate.

In particular embodiments, storage 83 may include mass storage for data or instructions. As an example, storage 83 may include a hard disk drive (HDD), a floppy disk drive, flash memory, an optical disc, a magneto-optical disc, magnetic tape, or a Universal Serial Bus (USB) drive or a combination of two or more of these. Storage 83 may include removable or non-removable (or fixed) media, where appropriate. Storage 83 may be internal or external to computer system 80, where appropriate. In particular embodiments, storage 83 may be non-volatile, solid-state memory. In particular embodiments, storage 83 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 83 may include one or more storage control units facilitating communication between processor 81 and storage 83, where appropriate. Where appropriate, storage 83 may include one or more storages 83.

In particular embodiments, I/O interface 84 may include hardware, software, or both, providing one or more interfaces for communication between computer system 80 and one or more I/O devices. Computer system 80 may include one or more of these I/O devices, where appropriate. One or more of these I/O devices may enable communication between a person and computer system 80. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 84 may include one or more device or software drivers enabling processor 81 to drive one or more of these I/O devices. I/O interface 84 may include one or more I/O interfaces 84, where appropriate.

In particular embodiments, communication interface 85 may include hardware, software, or both providing one or more interfaces for communication (such as, for example, packet-based communication) between computer system 80 and one or more other computer systems 80 or one or more networks. As an example, communication interface 85 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 80 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 80 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 80 may communicate using fiber-optic communication based on 100 Gigabit Ethernet (100 GbE), 10 Gigabit Ethernet (10 GbE), or Synchronous Optical Networking (SONET). Computer system 80 may include any suitable communication interface 85 for any of these networks, where appropriate. Communication interface 85 may include one or more communication interfaces 85, where appropriate.

In particular embodiments, bus 86 may include hardware, software, or both coupling components of computer system 80 to each other. As an example, bus 86 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 86 may include one or more buses 86, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 80. As an example, computer software may include instructions configured to be executed by processor 81. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A scene modeling system comprising:
   a camera system having a camera to capture images of the scene;
   an image processor configured to classify an object in the images from the camera using the images;
   a lidar system to generate a point cloud of the scene; and
   a modeling processor configured to generate a 3D model of the scene using the point cloud by generating a three-dimensional grid of the scene, determining free, occupied, and unknown portions of the grid, configured to correlate the classified object to a plurality of points of the point cloud, configured to assign the classified object to the correlated plurality of points, configured to locate the classified object on the grid, configured to account for the classified object in the occluded portions of the grid, and configured to model the plurality of points as the classified object over time in the 3D model of the scene.

2. The system of claim 1, wherein the lidar system is configured to produce a sequence of frames and wherein the modeling processor is configured to model the plurality of points by modeling the plurality of points through multiple frames of the sequence.

3. The system of claim 1, wherein the modeling processor is further configured to add size information to the classified object using the point cloud and to model the classified object using the size.

4. The system of claim 1, wherein the camera system comprises a plurality of cameras coupled to the image processor and wherein the image processor is configured to detect and classify additional objects in images from each of the plurality of cameras.

5. The system of claim 1, wherein the modeling processor is further configured to add distance information to the classified object using the point cloud and wherein the 3D model of the scene includes the distance information.

6. The system of claim 1, wherein the modeling processor is further configured to generate the 3D model of the scene using a combination of the classified object and the point cloud.

7. The system of claim 1, wherein the modeling processor is further configured to track the classified object in the scene through multiple lidar frames using the 3D model.

8. The system of claim 1, wherein the modeling processor is further configured to determine additional objects in the point cloud and wherein correlating comprises correlating the additional objects to point cloud objects.

9. The system of claim 1, wherein the modeling processor is further configured to track additional objects through lidar frames in which at least one of the additional objects are occluded by at least one other additional object in the model of the scene.

10. The system of claim 1, wherein classifying the object comprises determining a type of physical object corresponding to a detected object.

11. The system of claim 1, wherein the lidar system comprises:
    a light source configured to emit pulses of light;
    a scanner configured to scan at least a portion of the emitted pulses of light along a scan pattern contained within a field of regard of the lidar system, wherein a portion of the field of regard overlaps a region within a field of regard of the camera system; and
    a receiver configured to detect at least a portion of the scanned pulses of light scattered by one or more objects in the scene.

12. The system of claim 11, wherein the light source comprises:
    a pulsed laser diode configured to produce optical seed pulses; and
    one or more optical amplifiers configured to amplify the optical seed pulses to produce the emitted pulses of light.

13. The system of claim 1, wherein the light source comprises a direct-emitter laser diode configured to produce the emitted pulses of light.

14. A method of modeling a scene comprising:
    receiving captured images of a scene from a camera;
    classifying an object in the images from the camera using the images;
    receiving a lidar point cloud of the scene;
    generating a 3D model of the scene using the point cloud by generating a three-dimensional grid of the scene, determining free, occupied, and unknown portions of the grid;
    correlating the classified object to a plurality of points of the point cloud;
    assigning the classified object to the correlated plurality of points;
    locating the classified object on the grid;
    accounting for the classified object in the occluded portions of the grid; and
    modeling the plurality of points as the classified object over time in the 3D model of the scene.

15. The method of claim 14, further comprising updating an occluded space of the 3D model of the scene to include the classified object as moving into the occluded space.

16. The method of claim 14, wherein correlating the classified object comprises correlating a range gate for the classified object to the point cloud.

17. One or more computer-readable non-transitory storage media embodying software that is operable when executed to perform operations comprising:
    receiving captured images of a scene from a camera;
    classifying an object in the images from the camera using the images;
    receiving a lidar point cloud of the scene;
    generating a 3D model of the scene using the point cloud by generating a three-dimensional grid of the scene, determining free, occupied, and unknown portions of the grid;
    correlating the classified object to a plurality of points of the point cloud;
    assigning the classified object to the correlated plurality of points;
    locating the classified object on the grid;
    accounting for the classified object in the occluded portions of the grid; and modeling the plurality of points as the classified object over time in the 3D model of the scene.

18. The media of claim 17, wherein correlating comprises applying a correction factor to the pixel positions of the classified object to shift the pixel positions to corresponding pixel positions of the point cloud.

19. The media of claim 17, the operations further comprising determining a range gate for the classified object from the images from the camera and correlating the range gate to the point cloud.

* * * * *